(12) United States Patent
Gao et al.

(10) Patent No.: US 6,383,293 B1
(45) Date of Patent: May 7, 2002

(54) APPLICATOR FOR COATING FIBROUS MATERIALS

(75) Inventors: Guang Gao, Newark; Thomas Orin Matteson, Pickerington; David Lynn Molnar, Newark; Richard Alan Green, Dover, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/451,615

(22) Filed: Nov. 30, 1999

(51) Int. Cl.$^7$ ................................................ B05C 3/12
(52) U.S. Cl. ..................... 118/420; 118/405; 118/602
(58) Field of Search ........................... 65/48, 510, 529, 65/532, 443; 156/578; 118/420, 50, 405, 125, 602

(56) References Cited

U.S. PATENT DOCUMENTS

| | | | |
|---|---|---|---|
| 1,667,408 A | * | 4/1928 | Allen |
| 1,736,633 A | * | 11/1929 | Schutte |
| 2,873,718 A | | 2/1959 | Brautigam |
| 3,172,780 A | * | 3/1965 | Csok et al. |
| 3,951,631 A | | 4/1976 | Fulk |
| 4,088,468 A | | 5/1978 | Roberson |
| 4,222,344 A | | 9/1980 | Parbhoo |
| 4,324,495 A | | 4/1982 | Martinez |
| 4,329,750 A | | 5/1982 | Binnersley |
| 4,338,361 A | | 7/1982 | Lin |
| 4,494,436 A | | 1/1985 | Kruesi |
| 4,497,273 A | * | 2/1985 | Mitter |
| 4,512,281 A | | 4/1985 | Yamanishi et al. |
| 4,517,916 A | | 5/1985 | Barch et al. |
| 4,579,078 A | | 4/1986 | French et al. |
| 4,720,366 A | | 1/1988 | Binnersley et al. |
| 4,891,960 A | * | 1/1990 | Shah |
| 4,984,440 A | * | 1/1991 | McCall |
| 5,052,334 A | | 10/1991 | Sullivan |
| 5,411,589 A | | 5/1995 | Yoshida et al. |
| 5,741,549 A | | 4/1998 | Maier et al. |
| 5,779,758 A | | 7/1998 | Mann et al. |
| 5,843,202 A | | 12/1998 | Flautt et al. |

OTHER PUBLICATIONS

Rauschert product literature on Applicator Nozzel PD 525.

* cited by examiner

Primary Examiner—Brenda A. Lamb
(74) Attorney, Agent, or Firm—Inger H. Eckert; Stephen W. Barns

(57) ABSTRACT

An applicator for the deposition of size and other coating compositions onto the surfaces of reinforcing fibers, such as glass. The device may be used to apply aqueous or non-aqueous size to continuously formed fiber materials in a high speed forming process. The applicator may include an atomizing spray pre-applicator in combination with a slide-die applicator. The atomizing spray pre-applicator can be connected to a vacuum source, which increases contact of the spray with the fibers, and thereby improves coating coverage. The slide-die applicator may include a slide-die configuration that reduces leakage of the liquid coating. The process of using the invention can provide a more uniform thin film coating, higher coating efficiency, and better coating coverage than size applicators otherwise known in the art.

32 Claims, 13 Drawing Sheets

APPLICATOR FOR COATING FIBROUS MATERIALS

BACKGROUND OF THE INVENTION

The present invention relates to the application of coating materials such as a size onto the surfaces of reinforcing fibers, and more particularly to a method and apparatus for applying metered quantities of size onto the surfaces of continuous fibers, such as glass filaments. The use of an applicator according to the present invention can provide a more uniform thin film coating of size onto the fiber surface, higher glass fiber forming efficiency and a wider coating range than prior size application technologies.

The reinforced plastic industry has historically used reinforcing fibers of glass or other materials in the form of continuous or chopped fibers, strands or rovings to reinforce polymer matrices used in making a wide range of products. For example, glass fibers have been added to thermosetting polymer matrices for use in pultrusion, filament-winding, spray-up, sheet molding and bulk molding composite-making operations.

The continuous fibers, strands and rovings used as reinforcements are made from a molten fiberizable material that is introduced into a bushing or like device. The bushing is equipped with small apertures to allow passage of thin streams of the molten material. As the molten material emerges from the bushing apertures, each stream is attenuated to form a long continuous fiber. The continuously forming fibers may be gathered into strands and wound onto spools by attaching the strands to a mechanism such as a winder or pull wheel. The rate at which the winder pulls the fiber determines its diameter. Rapid winding creates thinner fibers of smaller diameter and slower winding generates thicker fibers. The rate of attenuation also affects the movement of the filaments through the fiber-forming process, and thusly affects the amount of coating material deposited onto the surface of the moving fibers. The forming packages or doffs formed by the aforementioned winding operation are then ready for use in composite-making operations.

Several problems have been associated with the use of continuous fibers and the rovings made from these fibers. A serious problem encountered with the use of wound rovings is the breakage of the individual fibers during winding, unwinding or handling of the strands. Inter-filament abrasion of the fibers causes them to break, and as a result loose ends are separated from the fiber strands. These loose, broken ends form a roughened layer or fuzz on the surface of the fibers and causes build-up of fuzz on the contact points and other surfaces of the processing machinery. Abrasion can reduce the tensile strength of the fibers by 50% or more.

It has been recognized that, in order to reduce fuzz and to provide improved tensile strength to the fibers, it is advantageous to provide a light coating of a size material onto the surface of the fibers after they have been emitted from the fiber-forming apparatus. A size is particularly desirable when the fibers are to be used as reinforcing elements in resinous articles. More particularly, a size is desirable where the fibers are required to have specific chemical properties, such as a high compatibility with a particular resin. In addition, application of a size reduces fuzz and improves fiber processing properties such as bundle cohesion, spreadability, texture (smoothness and softness), abrasion resistance and bundle unwinding ease.

Generally, the size may be either aqueous or non-aqueous. Non-aqueous size typically includes a low-boiling organic solvent combined with other functional ingredients such as a film-forming resin, a coupling or keying agent and lubricant to form a solution. In aqueous size solutions, the resin and other ingredients are often dispersed in water to form an emulsion. The size is then solidified to provide a uniform size layer on the surfaces of the fibers.

The size may be applied to the fibers in an on-line operation immediately after the fibers are formed, or it may be applied off-line to unwound fiber strands that have been previously formed and packaged. Preferably, the fibers are wet with the size soon after they are emitted from the bushing. The application of the size at this early stage helps to protect the fibers from damage during the initial winding and handling.

In applying the size, it is important to achieve uniform coverage of all the exposed surfaces without a build-up of excess size on the production equipment, or on localized portions of the fibrous surface being treated. A variety of size applicators have been developed to meet the objective of providing a uniform coating of size onto the surfaces of the fibers.

One such method of applying size involves the use of an immersion bath, according to the dip-draw method. In this process, a bundle of fiber is pulled through an immersion bath, such as a trough, which contains the size to be applied. Excess size is removed from the fiber surfaces by passing the bundle through a narrow sizing die. One of the problems associated with this method, however, is the difficulty in obtaining a uniform coating. The degree of penetration of the sizing material within the fiber bundle is limited in this process and there is considerable clumping of the size around the orifices of the die.

Another type of applicator is a rotating roller that is continuously wetted with liquid size. In the operation of this device, drawn fibers are passed over the surface of the roller. The roller usually rotates in the same direction as the movement of the fibers, but for some applications it may counter rotate. The amount of size applied to the moving fibers is controlled by changing the flow rate of the size onto the roller, or adjusting the rate of rotation of the roller. Another type of rotating applicator uses an apron belt instead of a roller to bring the size into contact with the moving fibers.

Rotating applicators present several problems, including poor control of the amount of size that is metered to the applicator. A rotating applicator's metering will depend on the speed of rotation of the roller, the rate of movement of the drawn fiber, the density of the fibers, and the viscosity and surface tension of the sizing material. The accuracy of the metering system relies on system variables remaining constant. However, these system variables tend to fluctuate. Minimal fluctuations in any one of these variables causes noticeable variation in the application rate, thickness and uniformity of the size. Further, rotating applicators abrade and even break glass fibers as a result of roll wrapping and fiber walking. The rotating action of these applicators also causes fibers to bundle together, thereby inhibiting the formation of a uniform size.

Spray applicators have also been used in the art as a means of applying size. In such a process, a spray of droplets of the size is directed toward a fan of fibers being formed from a bushing. Known problems associated with this process include low penetration of the size between the fibers as a result of the air-drag induced by the downward movement of the fibers. Because the relative momentum of the droplets in relation to the moving fibers is low, a majority of the spray tends to be dragged downward and does not penetrate the stream of fibers sufficiently to provide good surface coverage.

Size may be also applied using a slide applicator. In such a device, the sizing material is forced through a hole or slot at an appropriate rate to form a bead of size that is contacted with the surfaces of continuous glass fibers as they are directed past the hole or slot. The fibers are channeled past the bead using guides as they are extruded from the slot. The fibers are coated as they pass through the bead of size. A variety of die designs have been made to accommodate a variety of fiber types and size of positions. These dies are typically made of a ceramic material.

A typical defect of slide applicators is "leaking flow", which is the wicking flow of liquid size between the moving fiber and the die lips. Leaking flow gives the coating bead a wavy meniscus, which causes flow rate variations in the cross-slide direction. Leaking flow also reduces the efficiency of size pick-up. One of the reasons for this leaking flow is the vortex flow generated by the high-speed fiber shearing motion relative to the diverging bead region.

Accordingly, there exists in the art a need for an applicator for various types of coatings, such as aqueous and non-aqueous size, that is capable of providing a uniform size onto the surfaces of continuously forming fibers during high-speed fiber forming operations, while eliminating commonly recognized problems such as leaking flow. There also exists a need for a process of applying size to the surfaces of reinforcing fibers, which provides a uniform thin film coating on the fiber surface, and thereby improves the efficiency of the fiber-forming process by reducing fiber breakage during formation, and which improves the size pick-up efficiency and coating operability. These needs are met by the applicator apparatus and process described below.

SUMMARY OF THE INVENTION

In accordance with a first aspect of the present invention, a slide-die applicator is provided for applying size to fibers. The slide-die applicator comprises a central body having a central surface bounded by a first edge, a second edge, a top edge and a bottom edge. The top and bottom edges lie in a common plane. The central body further comprises a rear surface and a slot. The slot has an upper lip having an upper lip surface and a lower lip having a lower lip surface. The upper lip defines an upper lip angle between the upper lip surface and the common plane. The lower lip defines a lower lip angle between the lower lip surface and the common plane. The slide-die applicator further comprises a first outwardly projecting side wall having a first inner edge attached to the first edge of the central surface. The first outwardly projecting sidewall further has a first outer edge. The slide-die applicator further comprises a second outwardly projecting side wall having a second inner edge attached to the first edge of the central surface. The second outwardly projecting sidewall further has a second outer edge. The first and second inner edges define a minimum aperture distance therebetween. The first and second outer edges define a maximum aperture distance therebetween. The first and second outwardly projecting walls define an inner region therebetween. The slot connects the central surface of the central body to a source of a size to allow the size to move from the source of the size to the central surface of the central body.

In accordance with a second aspect of the present invention, an applicator apparatus is provided for applying size to a fiber. The applicator apparatus comprises a slide-die applicator and a fluid flow control means in fluid contact with the slide-die.

In accordance with a third aspect of the present invention, a process is provided for applying one or more coating compositions onto a surface of a continuously formed fiber. The process comprises the steps of forming the fiber from a source of molten material, and passing the fiber through the applicator apparatus of the present invention.

Further objects, features and advantages of the present invention will become apparent from the detailed description that follows. It is understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention, and together with this description serve to explain the principles of the invention.

DESCRIPTION OF THE PREFERRED EMBODIMENTS OF THE INVENTION

Figure 1:
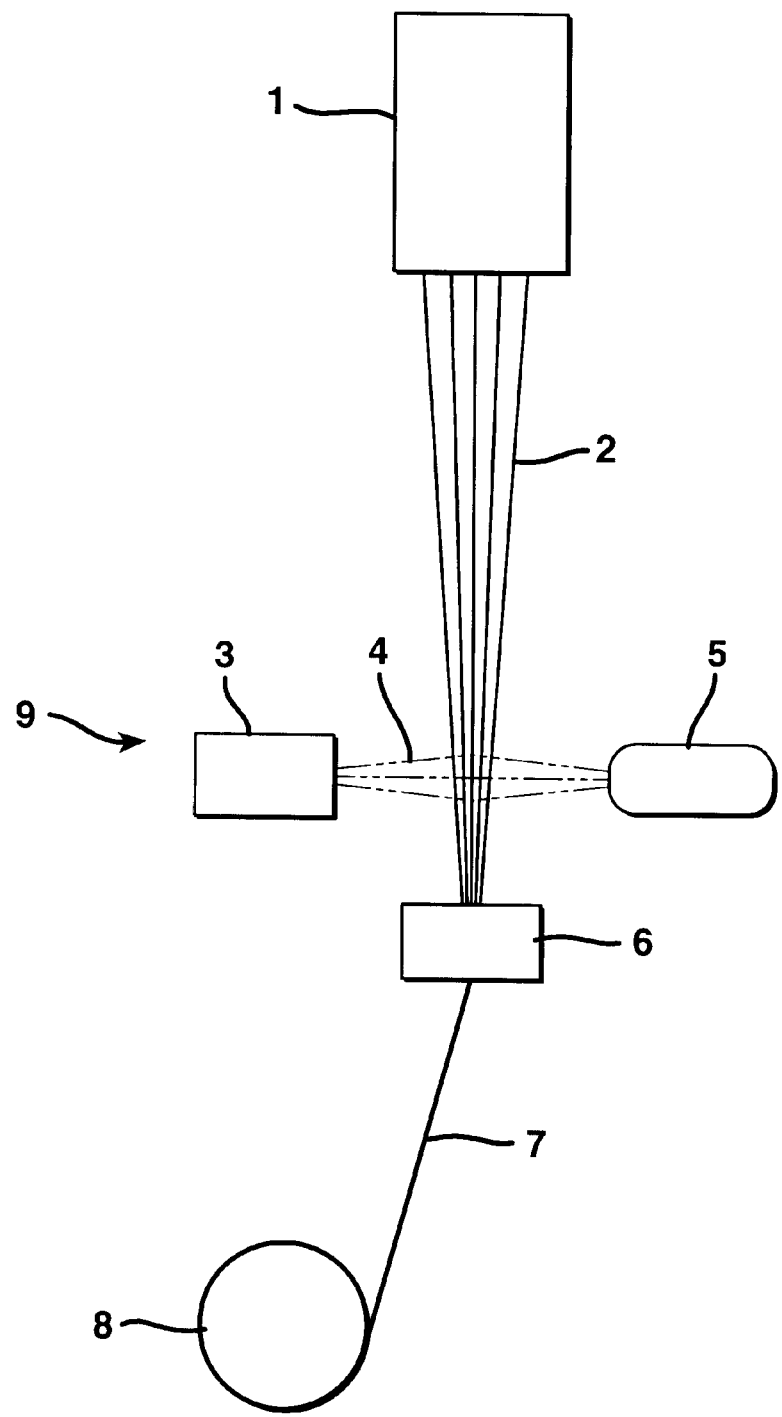
FIG. 1 is a cross sectional view of a general layout of a fiber forming operation in accordance with the present invention.

Referring now more particularly to the drawings, FIG. 1 illustrates a fiber-forming process and apparatus 9 using a slide-die applicator 6 with pre-applicator 3 in accordance with the present invention. Mineral material, such as glass, is maintained in a molten state in a bushing assembly 1 from which a plurality of streams of the molten material is emitted from the orifices in the bushing and attenuated into fibers 2.

In operation, the fan of glass fibers 2 ranging in diameter from about 5 to about 30 microns, is pulled downward from the bushing assembly 1 past the applicator apparatus 9. As the fibers move downward, a pre-applicator 3 emits a pre-spray liquid 4 onto the newly formed fibers to cool and/or lubricate the fibers.

In the embodiment shown, a vacuum source 5 may be established directly opposite the pre-applicator 3 such that the stream of moving fibers 2 passes between the pre-applicator and the vacuum source.

After the pre-spray 4 is applied, the fibers 2 are optionally gathered into a strand and then pulled through the slide-die applicator 6, which coats the fibers with a secondary layer of size. The resulting sized strand 7 may then be wound on to a collet 8 or other packaging support, stored or immediately used in subsequent processing.

Figure 2:
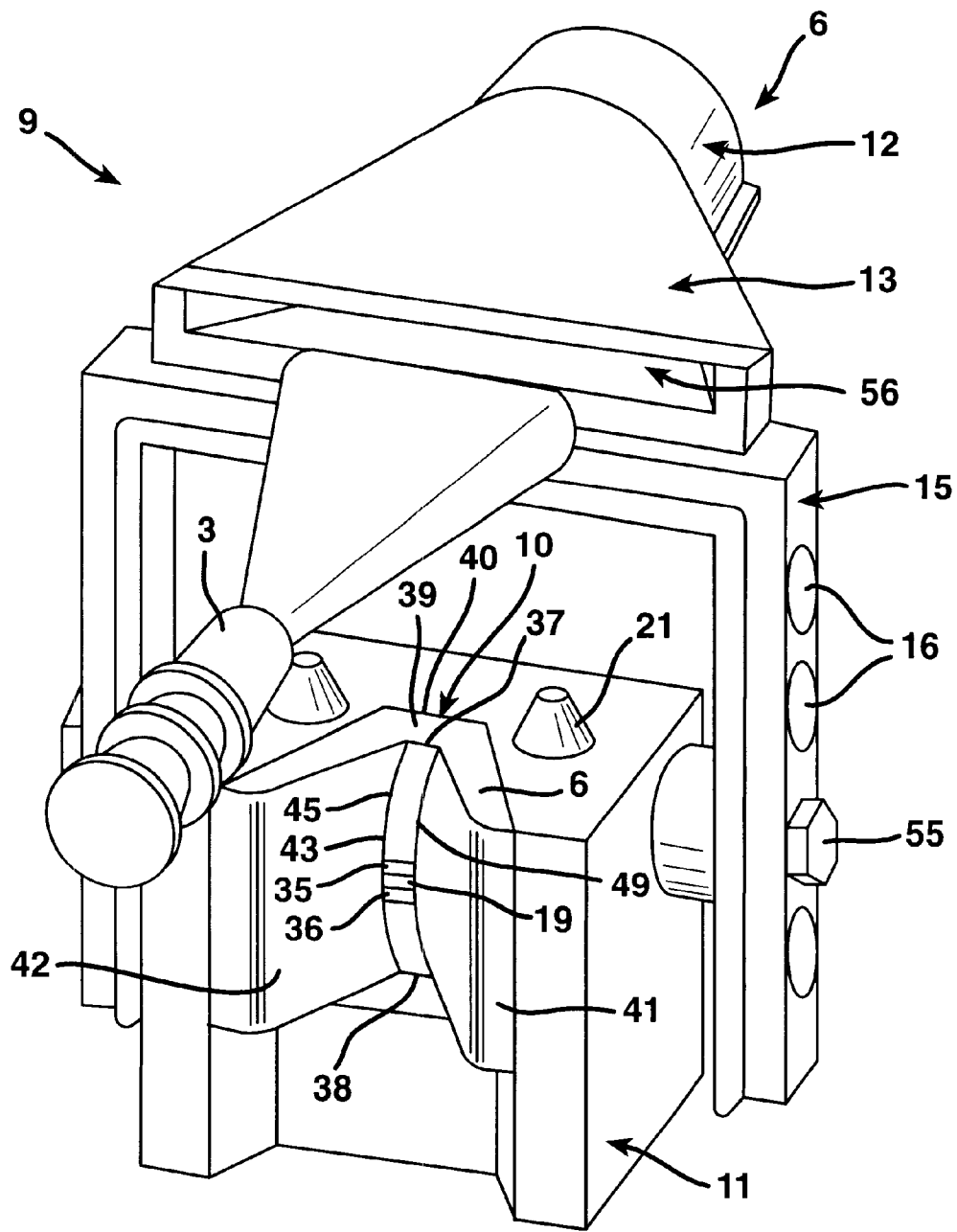
FIG. 2 is a perspective view of a first embodiment of an applicator apparatus for applying size to a fiber according to the present invention.
Figure 2A:
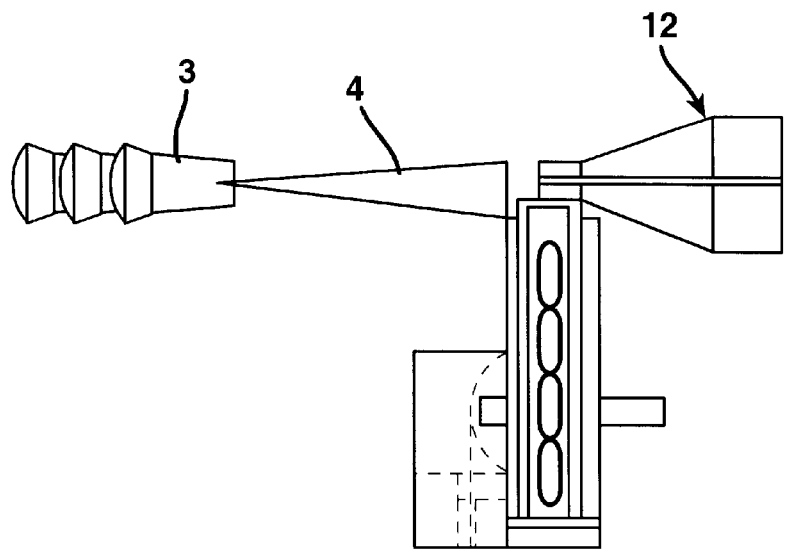
FIG. 2A is a side view of the apparatus shown in FIG. 2.
Figure 2B:
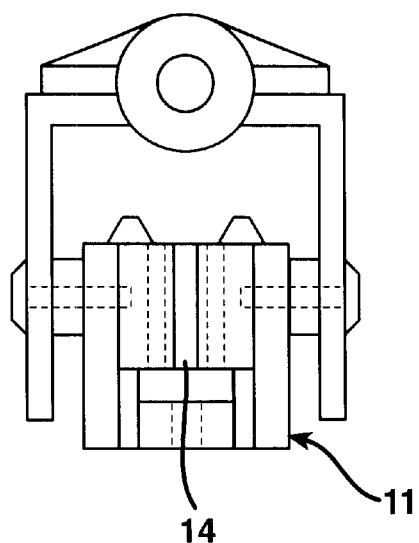
FIG. 2B is a front view of the apparatus shown in FIG. 2.

As shown in FIGS. 2, 2A and 2B, in a first embodiment of the applicator apparatus comprises a slide-die applicator 6 mounted on a holding block 11, above which is positioned a pre-applicator 3 and a vacuum source 5. The pre-applicator 3 is positioned on the same plane as the vacuum source 5, at a variable distance from the fan of fibers 2 (shown in FIG. 1). In a preferred embodiment, the pre-applicator 3 is positioned about 2.58 inches from the vacuum source 5. As shown, the pre-applicator 3 may comprise a spray nozzle and the vacuum source 5 may comprise a vacuum manifold 12 attached to a vacuum bracket 13. The holding block 11 and the vacuum bracket 13 are removably held together by a supporting means. The supporting means comprises a frame 15, which is securely fastened to the holding block 11. The supporting means holds the vacuum bracket 13 and the holding block 11 in a fixed position relative to each other. Adjusting means 16 spaced at intervals along the sides of the frame 15 permit adjustment of the distance between the vacuum bracket 13 and the holding block 11. Any suitable means may be used to fasten the supporting means to the holding block 11 and the vacuum bracket 13. Preferably, bolts 55 pass through holes in the frame 15, and pass into a threaded portion in the holding block 11 to fasten the frame 15 to the holding block 11.

The vacuum manifold 12 is preferably removably connected to the vacuum bracket 13, by any suitable means. The vacuum bracket 13 may be of any conventional construction known in the art. In a preferred embodiment, the vacuum bracket 13 has an inner opening 56 positioned opposite the pre-applicator 3 such that the fibers 2 shown in FIG. 1 pass between the inner opening 56 and the pre-applicator 3. Typically the inner opening 56 is wider and not as tall as the outer opening of the vacuum bracket 13, which connects the vacuum bracket to the vacuum manifold 12 preferably, the inner opening 56 has a smaller surface area than the outer opening, A typical vacuum manifold 12 is composed of a funnel shaped metal or plastic enclosure through which a vacuum or negative pressure is drawn by the vacuum source 5. Negative pressure established by the vacuum manifold 12 assists the coating of the fibers 2 with pre-spray 4 by pulling the droplets in a horizontal direction across the fan of fibers, while collecting any excess pre-spray, in the form of droplets that do not contact any of the fibers 2. The excess pre-spray may be recycled to the pre-applicator 3. The vacuum source 5 may be any means of establishing negative pressure that is known in the art. For example, vacuum can be provided by a SEARS CRAFTSMAN 16 gal 5HP SHOPVAC Model 113.177000 pressure range between 0 to 90 inches $H_2O$. In a preferred embodiment, the vacuum is positioned to enable the vacuum to collect excess pre-spray and more precisely target the spray penetration direction.

Figure 3A:
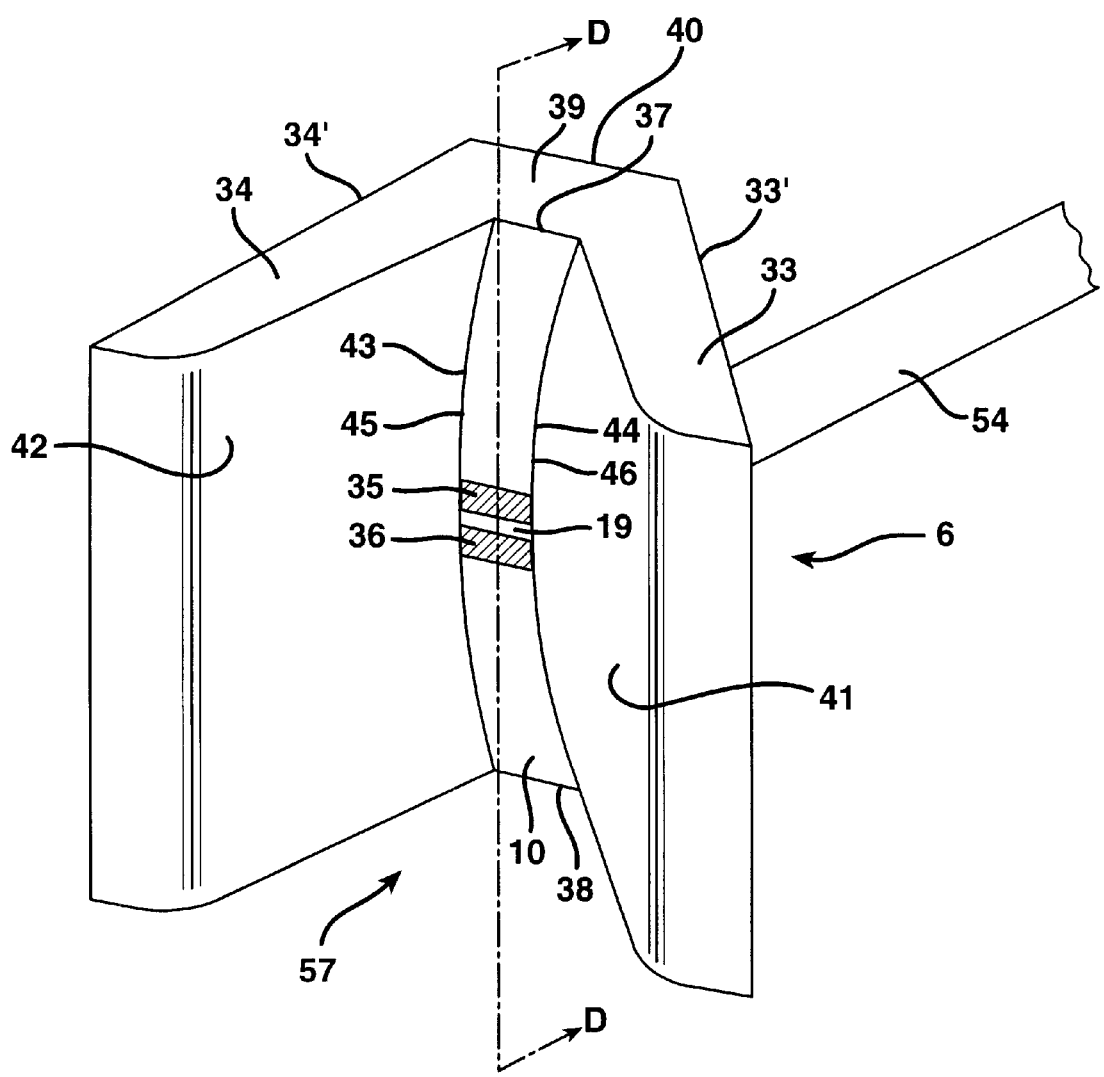
FIG. 3A is a perspective view of a first embodiment of a slide-die applicator according to the invention.
Figure 3B:
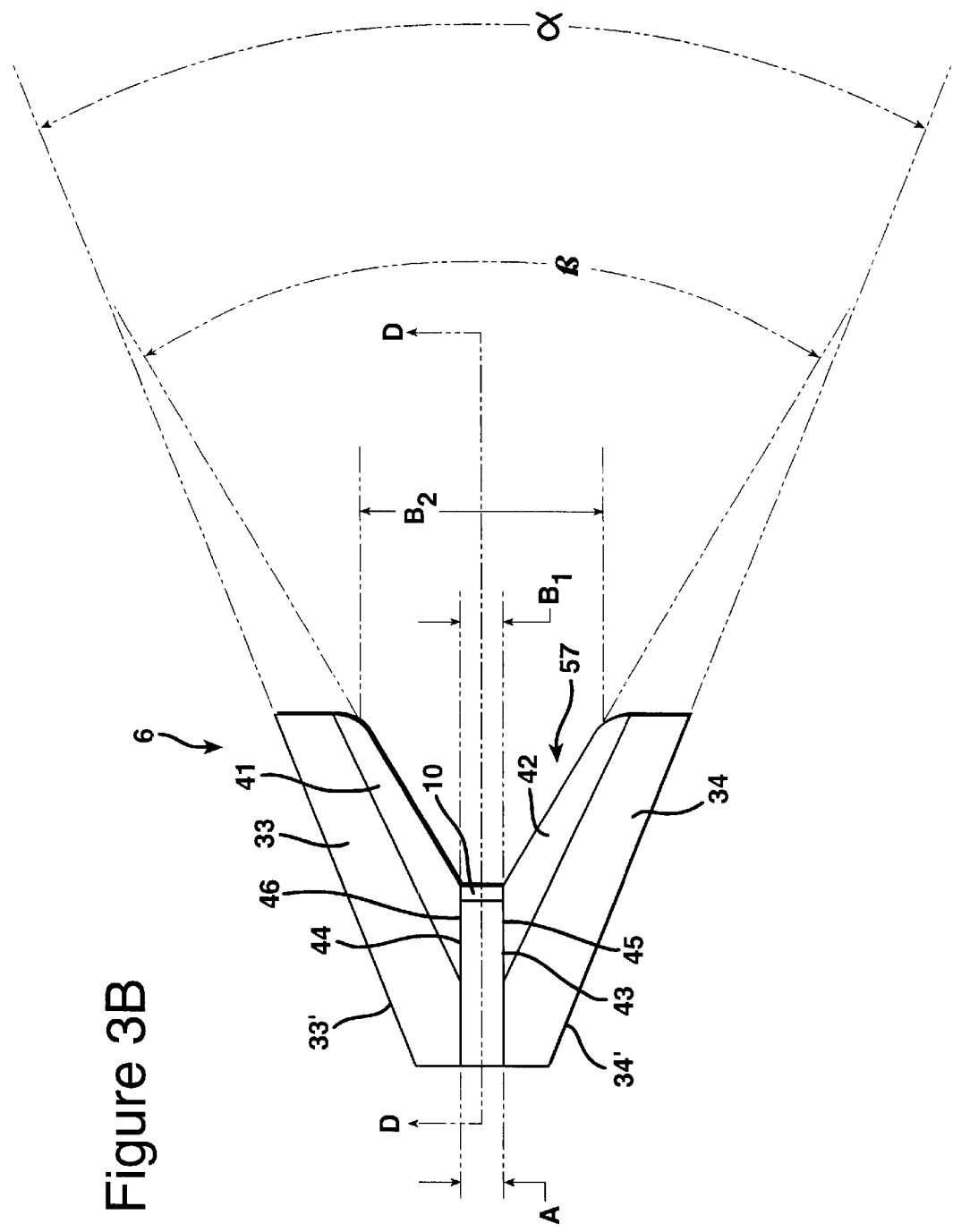
FIG. 3B is a top view of the slide-die applicator of FIG. 3A.
Figure 3C:
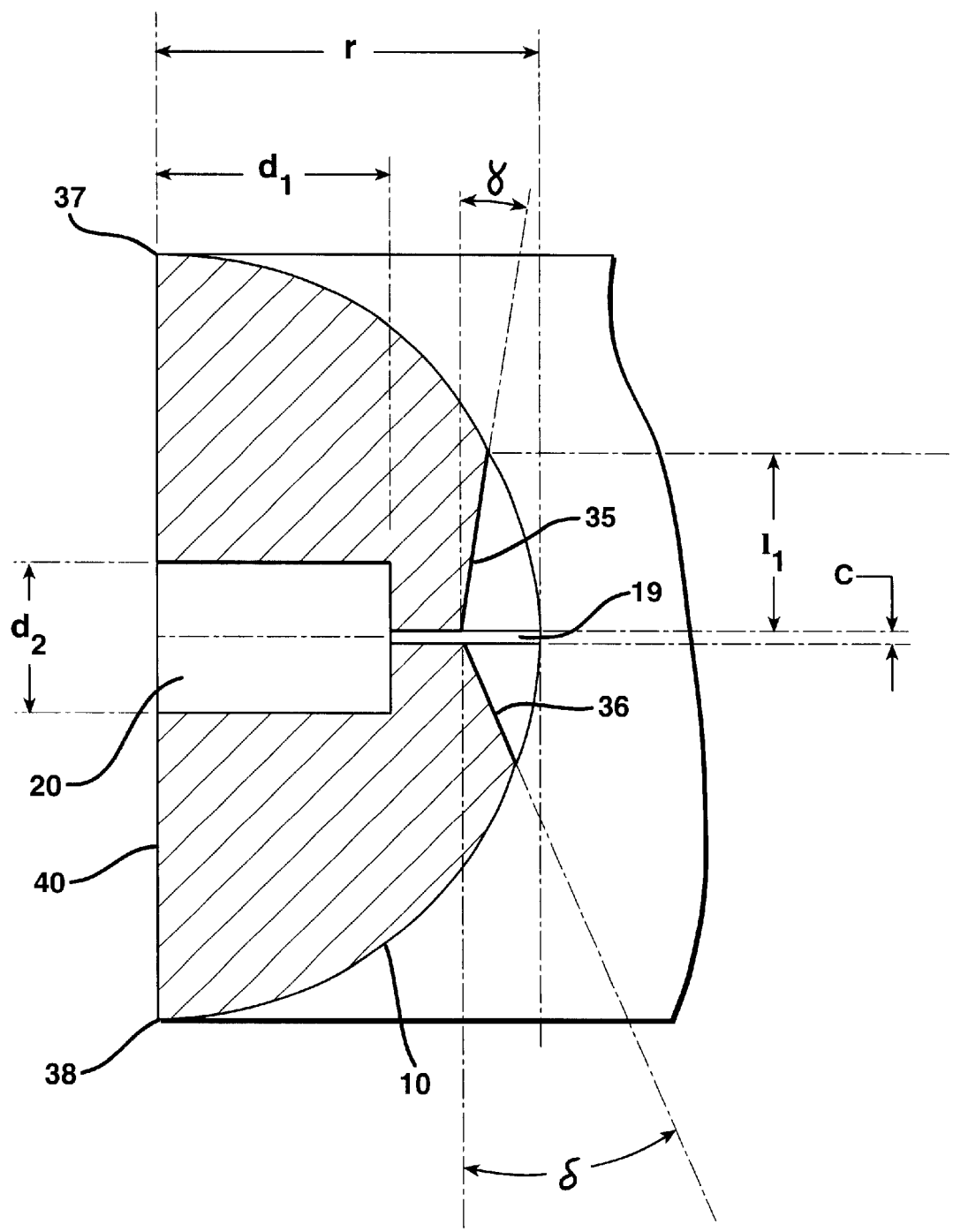
FIG. 3C is a cross-sectional side view of the slide-die applicator of FIG. 3A taken along line D—D.

As shown in FIGS. 3A–3C in a preferred embodiment the slide-die applicator of the invention comprises a central body 39, having a central surface 10 which includes a slot 19 for delivery of the sizing or coating composition, in the form of a bead, from a rear surface 40 to the central surface 10. The central surface 10 also has a first edge 43 and second edge 44, a top edge 37 and a bottom edge 38. The central surface 10 is preferably of a generally semi-circular shape projecting from the plane extending between the top edge 37 and the bottom edge 38. The rear surface 40 of the slide-die may be of any suitable shape, however, it is preferably of a shape that may be anchored to the holding block 11 as shown in FIG. 2. The slide-die also has a first outwardly projecting side wall 34 having a first inner edge 45 and a first outer edge 34'; and a second outwardly projecting side wall 33 having a second inner edge 46 and a second outer edge 33'.

The central surface 10 preferably has a flat, concave, or convex shape projecting from the plane extending between the first edge 43 and the second edge 44 of the central surface 10. Each shape produces acceptable results, however particularly successful performance has been achieved using the concave shape.

Figure 3D:
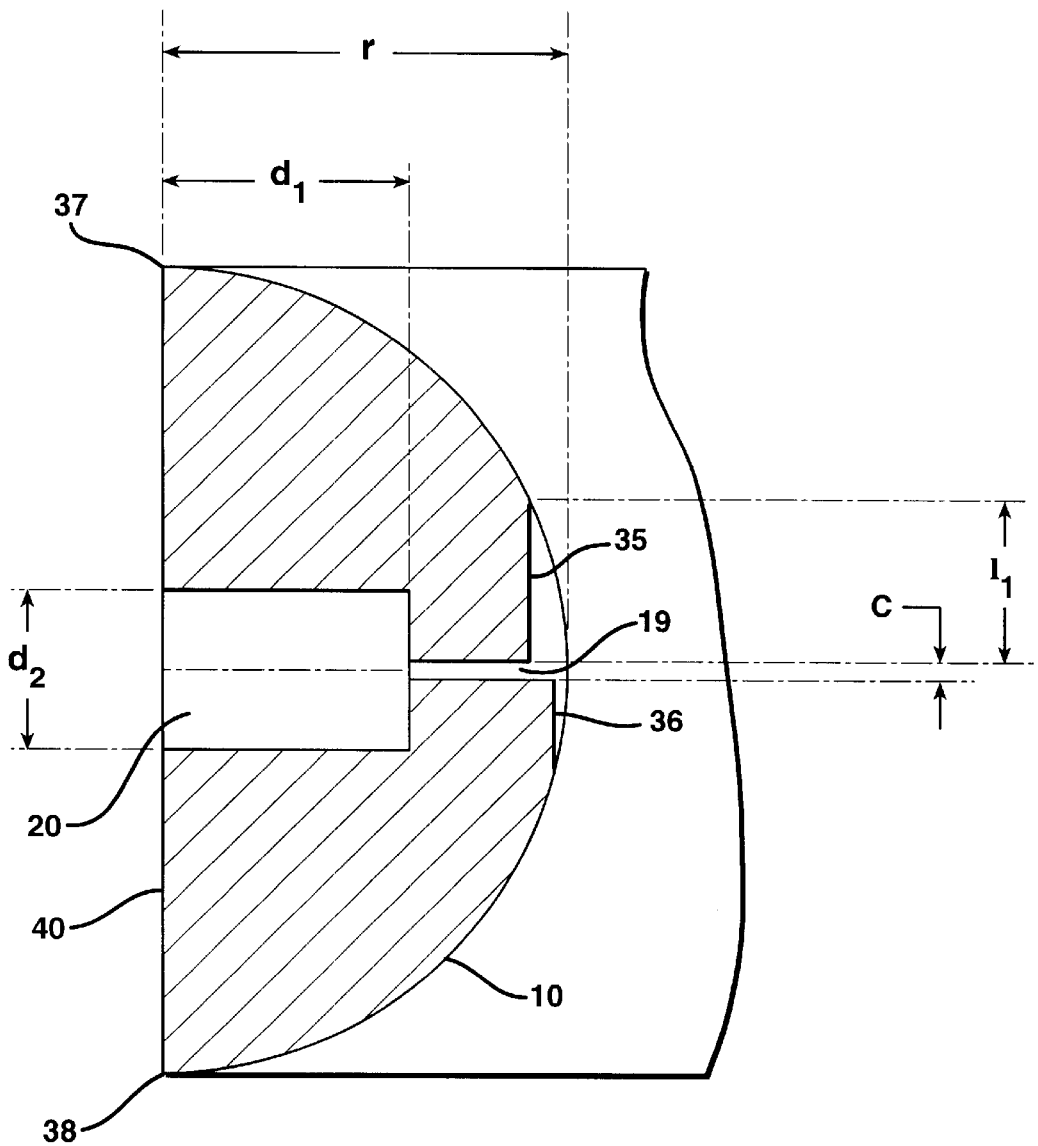
FIG. 3D is a cross-sectional side view of a second embodiment of a slide-die applicator according to the present invention.

As shown, the slot 19 comprises an upper lip 35 and a lower lip 36. The upper lip 35 of the slot 19 has an upper lip angle y as shown in FIG. 3C defined as the angle between the surface of the upper lip 35 and the plane between the top edge 37 and the bottom edge 38 of the central surface 10, and the lower lip 36 of the slot 19 has a lower lip angle 8as shown in FIG. 3C defined as the angle between the surface of the lower lip 36 and the plane between the top edge 37 and the bottom edge 38 of the central surface 10. In a preferred embodiment, as shown in FIG. 3D, the lips 35, 36 form angles $\gamma$ and $\delta$ (not shown in FIG. 3D) of about 0 degree. The slot 19 connects the central surface 10 of the central body 39 to a source of a size to allow the size to move from the source of the size to the central surface 10. Preferably, the surfaces of the upper lip 35 and lower lip 36 are smoothed to reduce the potential for abrasion. The slot 19 is disposed approximately horizontally across the center of the slide-die applicator 6 to allow the flow of size from a reservoir through to the central surface 10. To aid the flow of the size from its source to the slot, the slide-die may also comprise a bore 20 shown in FIG. 3C, to which a supply conduit 54 for supplying size may be connected.

As shown in FIG. 3B, the outer surfaces 33' and 34' of the outwardly projecting side walls 33 and 34 meet at an angle $\alpha$, while the inner surfaces 41 and 42 of the outwardly projecting side walls meet the central surface 10 to form an angle $\beta$. In a preferred embodiment, $\alpha$ is about 45 degrees and $\beta$ is about 60 degrees. The first inner edge 45 of the first outwardly projecting side wall 34 is attached to the first edge 43 of the central surface 10, and the second inner edge 46 of the second outwardly projecting side wall 33 is attached to the second edge 44 of the central surface 10, wherein the slide-die applicator 6 has a minimum aperture distance $B_1$ defined by the minimum distance between the first inner edge 45 of the first outwardly projecting side wall 34 and the second inner edge 46 of the second outwardly projecting side wall 33, a maximum aperture distance $B_2$ defined by the minimum distance between the first inner surface 42 of the first outwardly projecting side wall 34 and the second inner surface 41 of the second outwardly projecting side wall 33, and an inner region 57 defined by the space between the first outwardly projecting wall 34 and the second outwardly projecting wall 33. The slot 19 has a slot width A, which, in a preferred embodiment, is substantially equal to the minimum aperture distance $B_1$.

Figure 4:
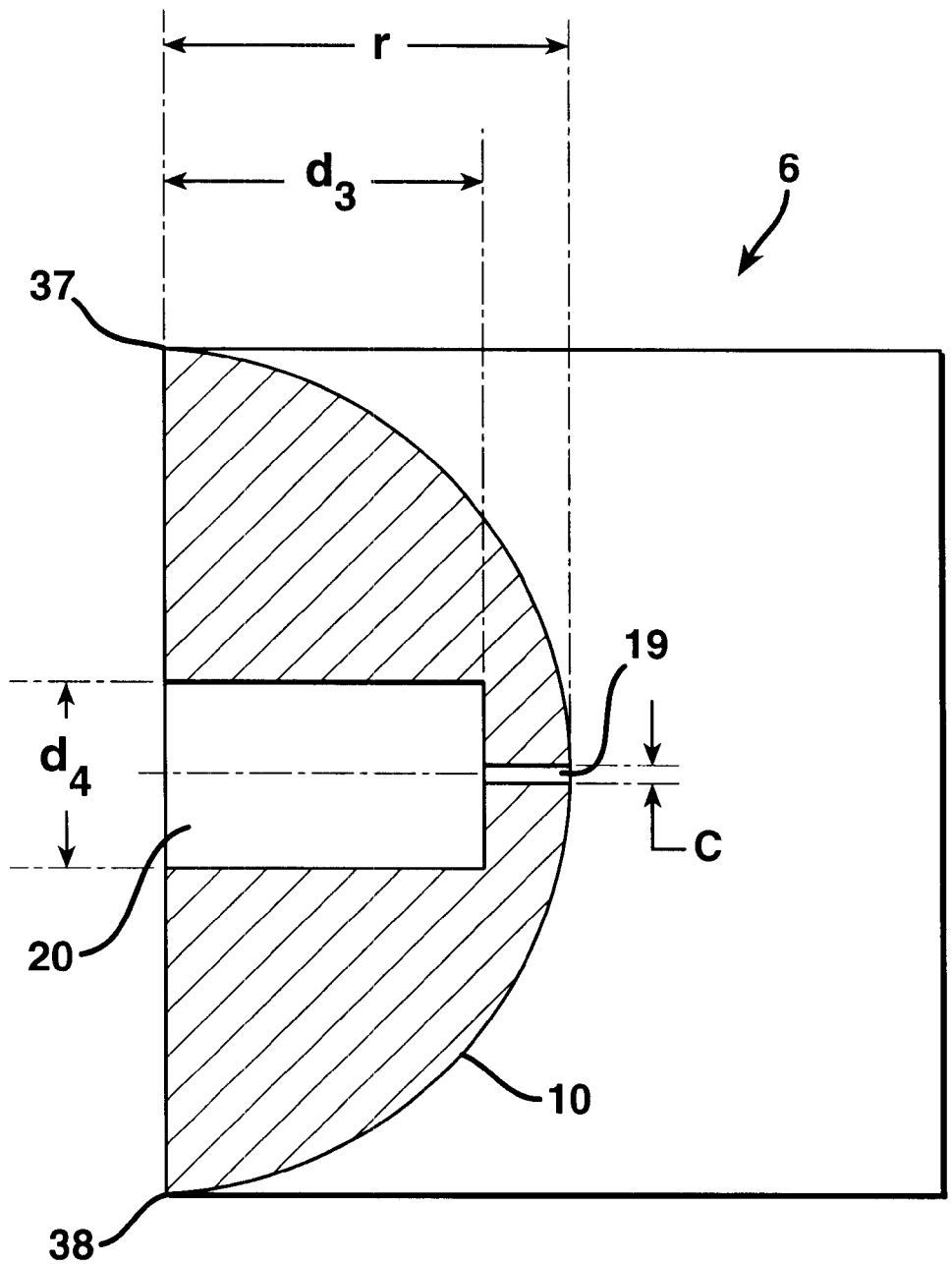
FIG. 4 is a cross-sectional side view of a third embodiment of a slide-die applicator according to the present invention.
Figure 5:
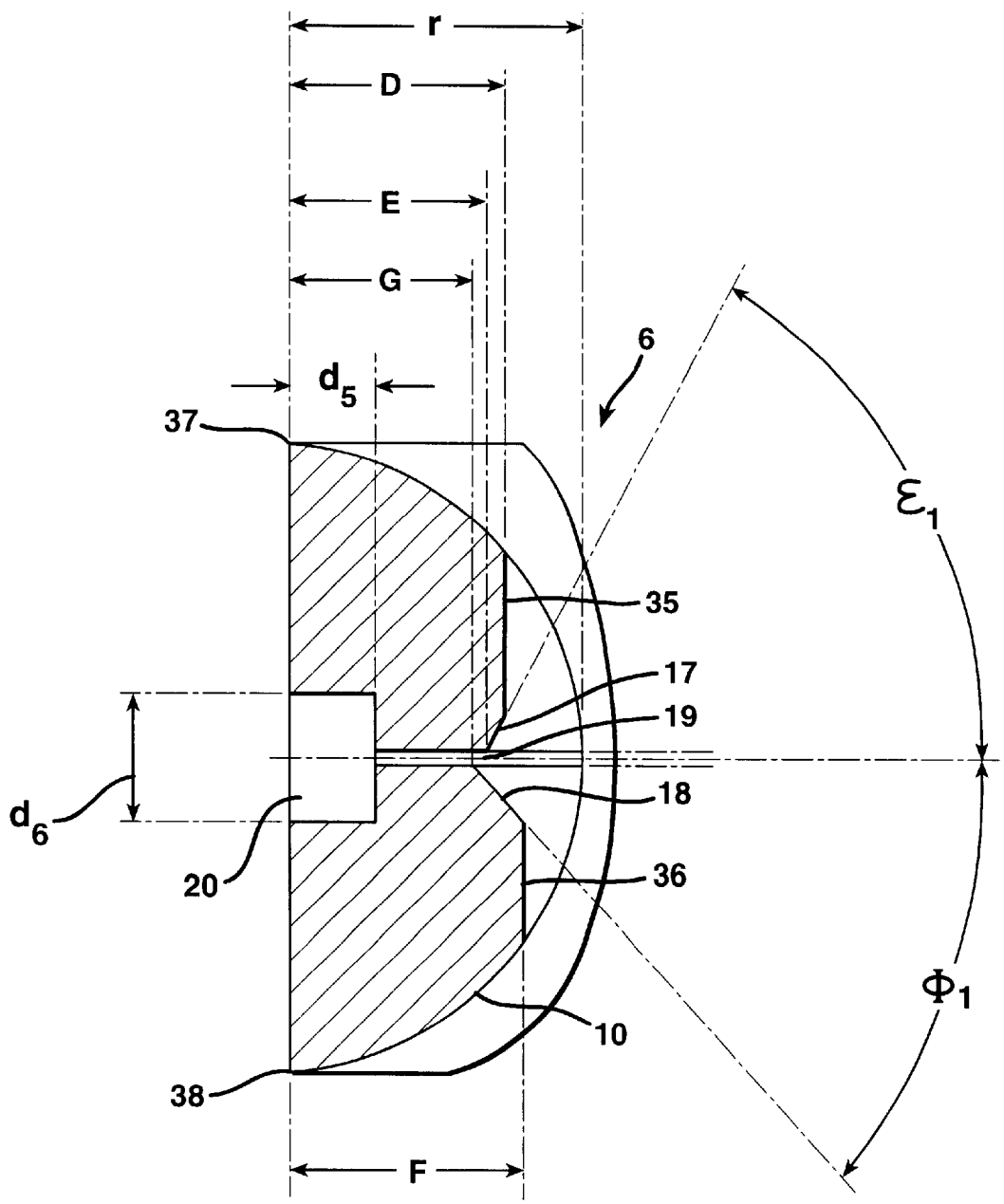
FIG. 5 is a cross-sectional side view of a fourth embodiment of a slide-die applicator according to the present invention.
Figure 6:
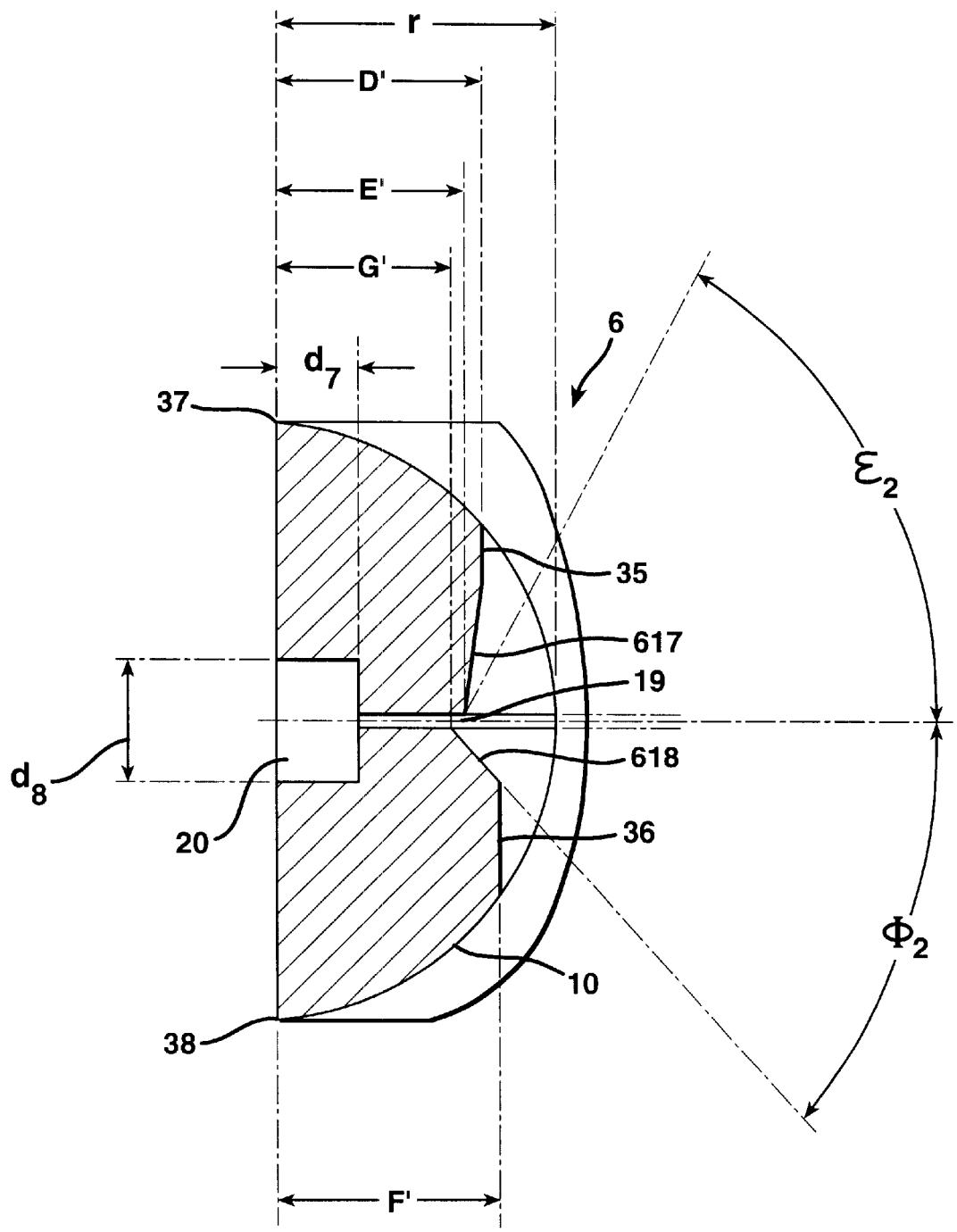
FIG. 6 is a cross-sectional side view of a fifth embodiment of a slide-die applicator according to the present invention.
Figure 7A:
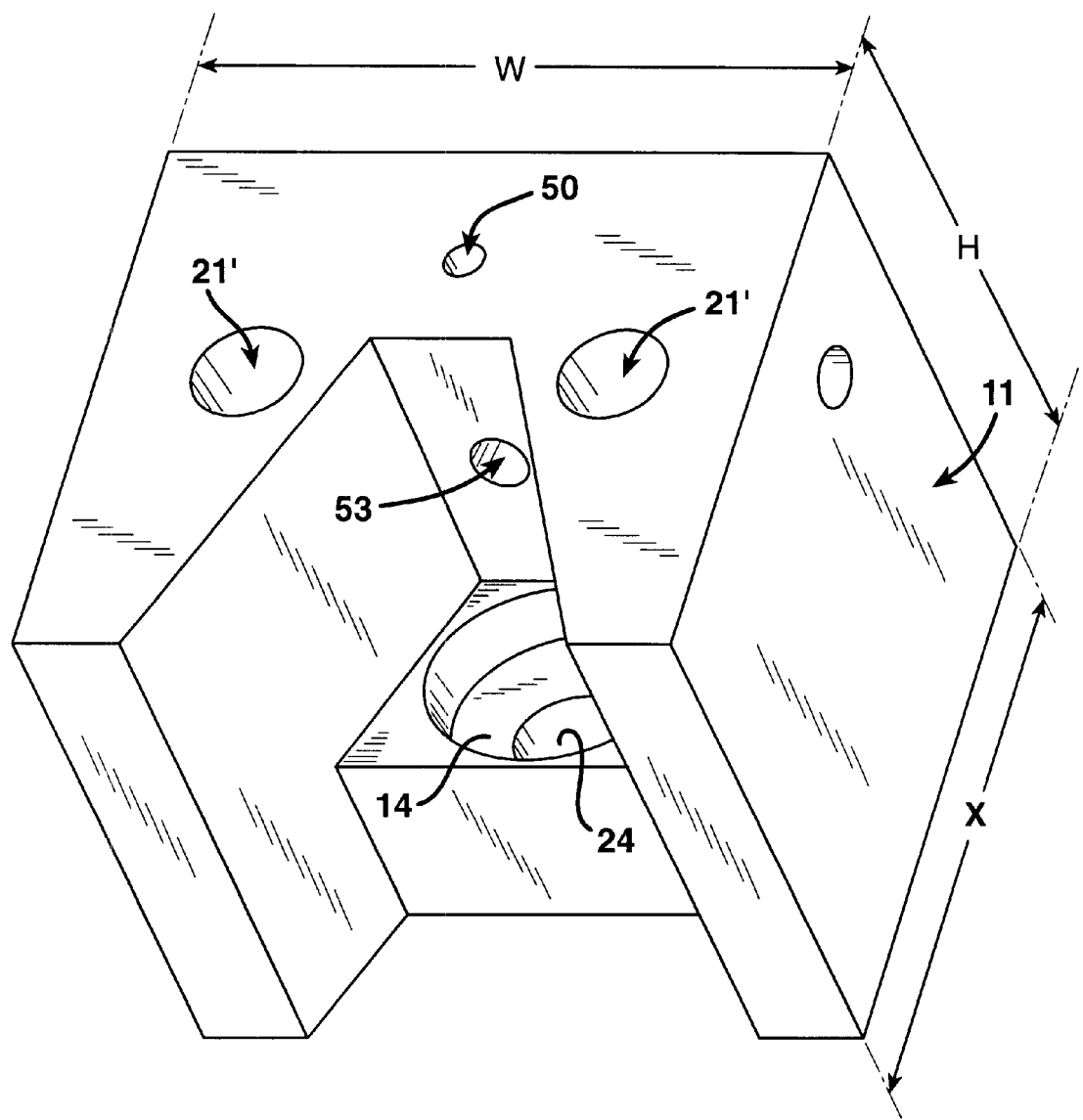
FIG. 7A is a perspective view of an embodiment of a holding block according to the present invention.
Figure 7B:
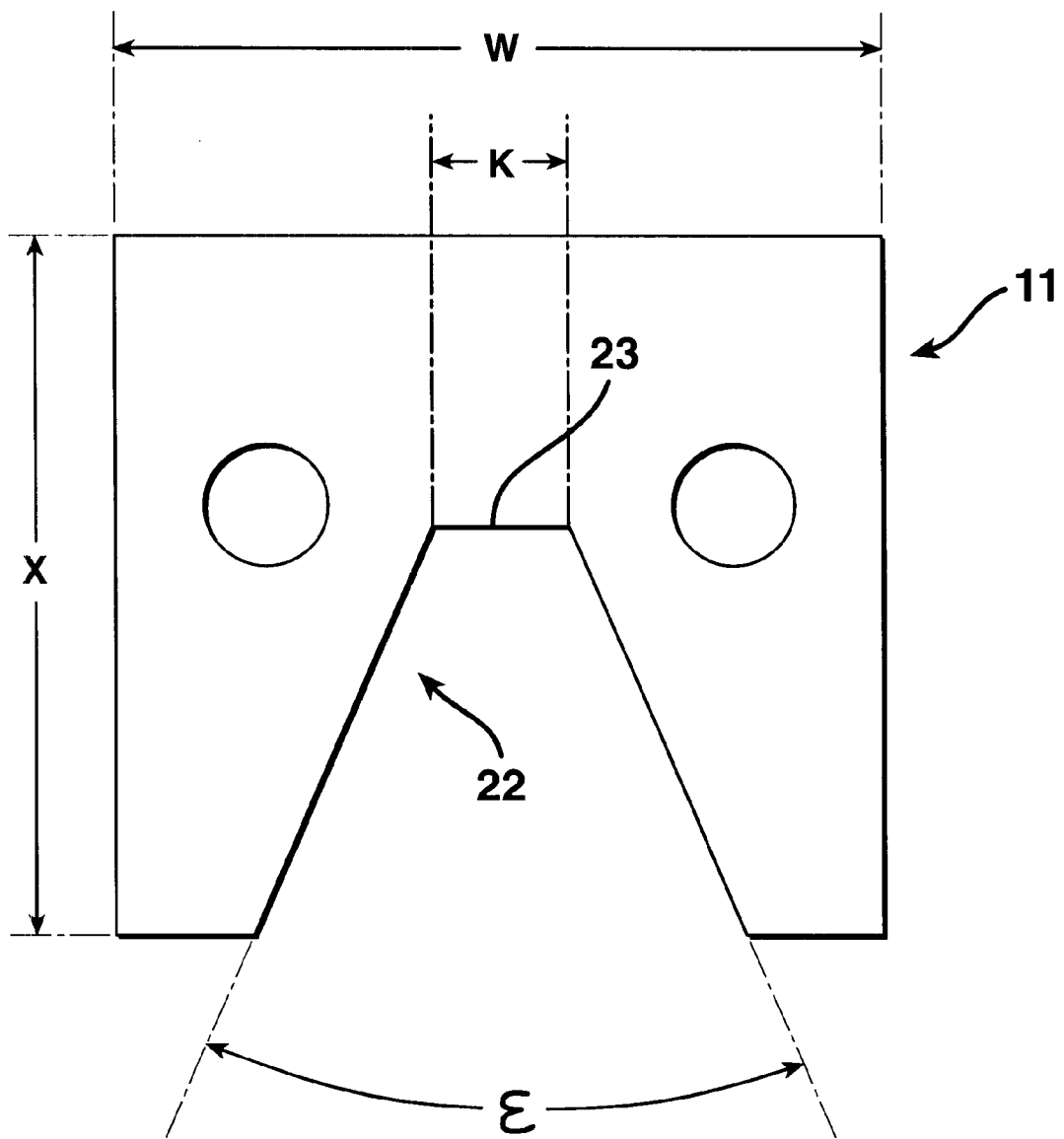
FIG. 7B is a top view of the holding block of FIG. 7A.
Figure 8:
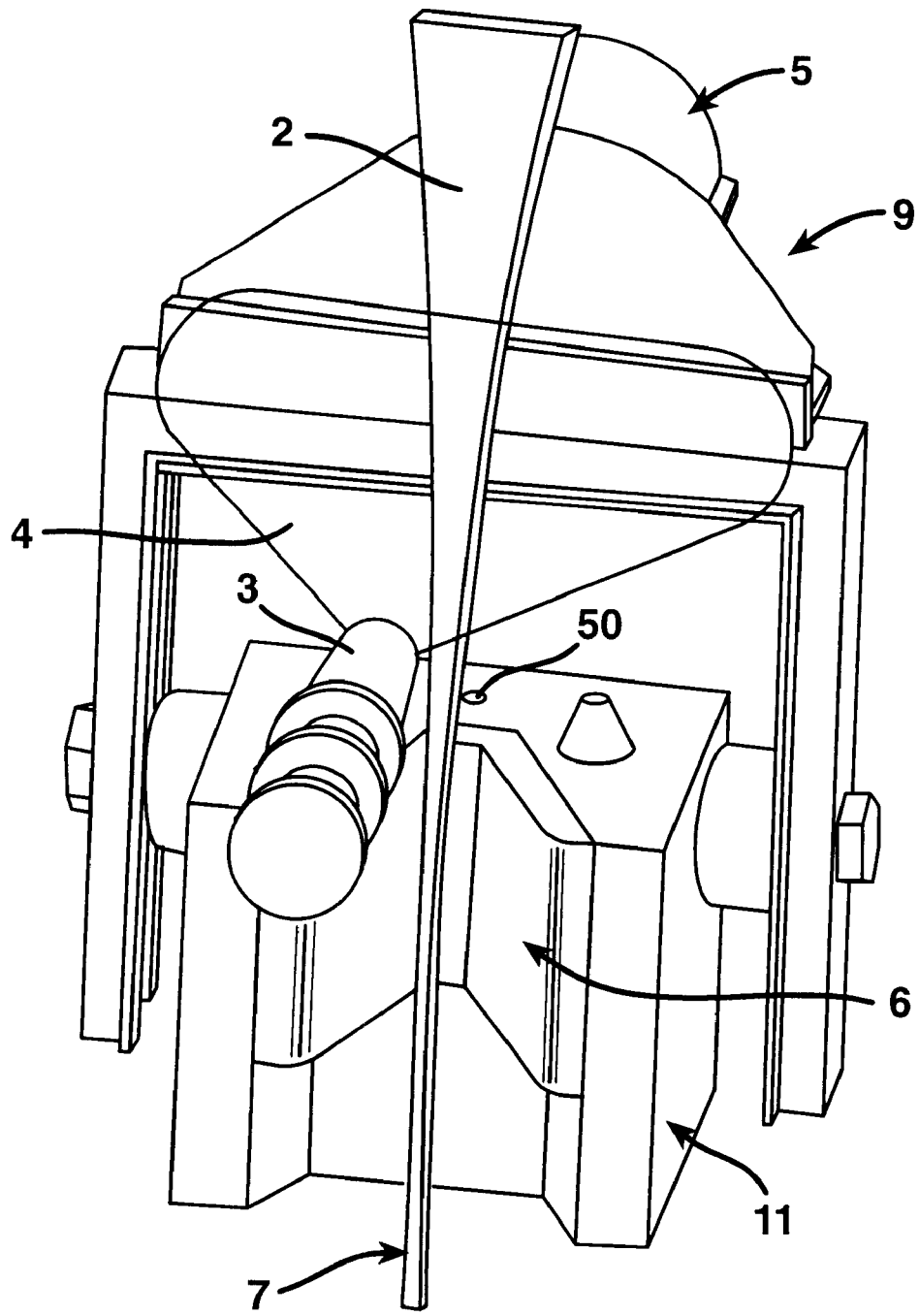
FIG. 8 is a perspective view of a second embodiment of an applicator apparatus for applying size to a fiber according to the present invention.

FIGS. 3D, and 4–6 show various embodiments of the slot 19 of the slide-die applicator 6 of the present invention. The upper lip 35 and lower lip 36 are shaped to favor uniform coating of the fiber surfaces while minimizing the occurrence of leaking flow. Further, the slot 19 is also configured to reduce the divergence of the coating bead and to substantially eliminate vortex of the coating flow. The configuration of the slot, including its upper lip 35 and lower lip 36, is preferably selected from one of four shapes: square as shown in FIG. 3D; round as shown in FIG. 4; incline with square as shown in FIG. 5; or incline as shown in FIG. 6.

According to one embodiment, as shown in FIG. 3D, the upper lip 35 of the slide-die applicator 6 is formed substantially perpendicular to the slot 19, herein after referred to as being shaped to form a "square", and the bottom lip 36 of the slide-die applicator 6 is similarly formed relative to the slot 19 to form a "square". The square lip 35, 36 design is cut into the semi-circular shaped central surface 10 adjacent the slot 19. In this embodiment, the central surface 10 has a radius r. In a preferred embodiment, radius r is about 0.625 of an inch. This square design is characterized by the upper lip angle as shown in FIG. 3C, being about 0 degree and the lower lip angle δ, as shown in FIG. 3C, being about 0 degree. In a preferred embodiment of the invention, the upper lip 35 is formed about 0.570 of an inch from the rear surface 40 of the central surface 10, and the upper lip 35 has a length $l_1$. Preferably, $l_1$ is about 0.25 of an inch. The slot 19 has a slot height C of preferably about 0.02 of an inch. The slot 19 is connected to a bore 20 having a diameter $d_2$ and depth $d_1$. Preferably $d_2$ is about 0.25 of an inch and $d_1$ is about 0.375 of an inch.

In the embodiment shown in FIG. 4, the slide-die applicator 6 and the related support structures are unchanged in dimension or position except for the lips 35, 36 having a "round" design. The round design is characterized by the lips 35, 36 having an uncut outer semi-circular edge of substantially the same spherical dimension as the central surface 10. Preferably, the bore 20 is about 0.25 of an inch in diameter $d_4$ and about 0.50 of an inch deep $d_3$.

Still another embodiment, as shown in FIG. 5, comprises the lips 35, 36 having an "incline with square" design. An exemplary configuration according to this embodiment is characterized by a straight cut across the center surface 10, perpendicular to the slot 19, with the corner 17 of the upper lip 35 nearest the slot 19 sheared off at an angle $\epsilon_1$. The slide-die further comprises a straight cut across the central surface 10 below and perpendicular to slot 19, with the corner 18 of the lower lip 36 nearest the slot 19 cut off at an angle $\phi_1$. Preferably, $\epsilon_1$ is about 60 degrees and $\phi_1$ is about 45 degrees. With reference to FIG. 5, length D is preferably about 0.460 of an inch, length E is preferably about 0.415 of an inch, length F is preferably about 0.50 of an inch, width G is preferably about 0.375 of an inch, $d_5$ is about 0.19 of an inch, and $d_6$ is about 0.25 of an inch.

The incline shape of the lips 35, 36 shown in FIG. 6, is characterized by a straight cut along the top portion of the central surface 10, perpendicular to the slot 19, with the corner 618 of the upper lip 35 nearest the slot cut off at an angle $\epsilon_2$. The incline design also has a straight cut along the bottom portion of the central surface 10, perpendicular to slot 19, with the corner 618 of the lower lip 36 nearest the slot cut off at an angle $\phi_2$. Preferably, $\epsilon_2$ is about 80 degrees and $\phi_2$ is about 45 degrees. In accordance with a preferred embodiment of the invention, length D' is about 0.456 of an inch, length E' is about 0.406 of an inch, length F' is about 0.496 of an inch, and length G' is about 0.366 of an inch. The bore 20 is about 0.300 of an inch deep $d_7$ and about 0.25 of an inch in diameter $d_8$.

The slide-die applicator is preferably comprised of a non-abrasive material that is minimally abrasive or completely non-abrasive. For example, the slide-die applicator may be constructed of graphite, which is considerably less abrasive than conventional ceramic materials, and therefore preferably permits passage of fibers of less than 9 microns in diameter with minimal forming breaks.

Any suitable fluid control means may be used to control the flow of size. Typically, the supply of the size is controlled by a positive displacement pump (not shown). Such a pump, also called a metering pump, delivers a fixed volume of size per pump revolution. Control of the pump rpm, therefore, controls the amount of size delivered.

The pre-applicator 3 preferably comprises a sprayer device having a nozzle or other atomizing attachment that produces fine droplets of a coating composition. The sprayer or nozzle can be of a mist-jet hollow cone type (commercially available from W.M. Steinem MFG), VeeJet flat spray type (commercially available from Spraying System Co.), air-atomizing type (commercially available from Spraying System Co.), impingement type (commercially available from Bete Fog Nozzle, Inc.) or any other commercially available nozzle can be used. Preferably, the sprayer is equipped with a nozzle having a filter of from about 5 microns to about 40 microns in pore size. An exemplary atomizing sprayer device is a Model number SUE18A air-atomizing nozzle having a 40-micron filter, with variable air and water pressure, which is commercially available from Spraying Systems Co.

A suitable sprayer device may be located in any suitable location. For example, the sprayer device may be located 2 inches to 8 inches above the slide-die applicator 6. Preferably, the sprayer device is located from about 2.5 inches to about 3.5 inches above the slide-die applicator 6, and about 1 inch to about 4 inches from the front of the fiber fan 2. The flow rate is preferably in the range of between 0.5 gallons/hr to 20 gallons/hr for a bushing throughput in the range between 30 lbs/hr to 400 lbs/hr.

The pre-applicator 3 may be used to apply any type of coating, such as an aqueous or non-aqueous size. Preferably, it is used to apply a pre-spray or first size to the newly formed fibers. More preferably, the pre-spray coating has a viscosity of from about 1 cps to about 200 cps. The pre-spray provides primary lubrication to the fibers before they are coated with a secondary coating using the slide-die applicator 6. Preferably, the size sprayed onto the fibers has a low viscosity, typically less than 10 cps. The pre-spray coating composition may be combined with air or another gaseous fluid that acts as a propellant to atomize the pre-spray composition into small droplets. Exemplary pre-spray coating agents that may be applied using the sprayer device of this invention include water (with a viscosity of 1 cp), or a combination of water and one or more wetting agents. Such wetting agents include, for example, surfactants such as those sold by BASF under the trade designation PLURONIC. Nonionic surfactants are preferred. However, anionic and cationic surfactants may also be used. Examples include fluorosurfactant FSO from DuPont of the structure $R_5CH_2CH_2O(CH_2CH_2O)H$. One typical wetting agent is SILWET L-77, which is a siloxane surfactant, commercially available from OSI Specialties, Inc. A specifically used surfactant is polyalkyleneoxide modified hexamethyltrisiloxane $C_{11}H_{30}O_3Si_3(C_2H_4O)n$. To obtain uniform spray coverage of the fiber fan with the pre-spray coating, it is desirable to maintain a balance between the spray location, i.e. the placement of the sprayer device in relation to the fibers, and the vacuum pressure.

The holding block 11, shown in FIG. 7A, is preferably of a one piece, unitary construction, and is designed to mount the slide-die applicator 6 and to provide for through-passage of the excess size into a recycle pan 14, which is preferably positioned beneath the holding block 11. The excess material collected in the recycle pan 14 may also be connected to the slide-die applicator input via a supply conduit. The excess material collected in the recycle pan 14 may then be recycled back to the slide-die applicator 6. The holding block 11 may be heated by at least one suitable heating means, such as a cartridge heater inserted into openings 21' in the holding block. Preferably, the cartridge heater 21 is inserted transversely through the block. Alternatively more than one cartridge heater may be used. Preferably, two cartridge heaters are inserted transversely across the block within sufficient proximity to the location at which the slide-die applicator 6 shown in FIG. 2 is mounted, such that the heat emitted from the heaters warms the surrounding regions of the block, which in turn warms the supply line for the sizing agent before it is distributed to the slide. Cartridge heaters are commercially available, for example, from Ogden Mfg. Co., Inc. (Arlington Heights, Ill. 60005).

In an exemplary embodiment of the invention, the holding block 11 as shown in FIG. 7A is a rectangular block of graphite having a width W, a height H and a depth X. Generally, W is about 2.25 inches, H is about 2.00 inches and X is about 2.00 inches. The outward face of the block is cut inward to form a truncated "V" shape 22 shown in FIG. 7B, with the two sides of the "V" oriented towards each other and meeting at an angle preferably of about 45 degrees. The upper section of the block, approximately the uppermost 1.25 inches of the holding block, may be truncated (preferably about 1.25 inches deep) forming a length K (preferably about 0.50 of an inch) formed at the back surface 23 of the "V" shape. Preferably, the lower region, of the "V", which is approximately the lowermost 0.75 of an inch, is shaped to a depth of about 0.50 of an inch. Typically, the recycle pan 14 is exposed by the upper truncation, formed by the truncated "V" shape 22, which is preferably about 0.75 of an inch in diameter and about 0.375 of an inch deep. A drain hole 24, preferably about 0.34 of an inch in diameter, is centered in the recycle pan, and a downward-sloping drainage conduit (not shown) is provided to allow excess liquid to drain completely. An orifice 53 is provided for the supply conduit 54. A feed-hole (not shown) for the slide-die reservoir, preferably about 0.25 of an inch in diameter, for providing input from the reservoir, is formed at preferably about 0.63 of an inch from the top edge 37 of the rear surface 40 of the central body 39 of the slide-die applicator 6. Preferably, holes for insertion of the cartridge heaters are provided at approximately 1.125 inches from the top edge 37 of the front of the slide-die applicator 6, and are about 0.375 of an inch in diameter and about 1.75 inches deep. There are also provided means for attaching the slide-die to the block. For example, as shown in FIG. 2, threaded holes (not shown) to receive bolts 55 may be provided on the right and left sides of the die.

FIG. 8 shows fibers 2 moving through an exemplary applicator apparatus according to the invention. Fibers 2 are treated with liquid 4 emitted from pre-applicator or spray nozzle 3. The vacuum manifold 5 assists in the pre-spray application as previously described. Then the fibers 2 travel through the slide-die applicator 6 to coat the fiber and produce coated fibers 7. A set screw 50 is used to fix the supply conduit 54 shown in FIG. 3A connected to the slide-die applicator 6.

As discussed above, each of the aforementioned designs when used in a sizing process according to this invention, demonstrate higher application efficiency, better size pickup, a reduction in the amount of forming moisture developed on the fiber surfaces, and an almost complete elimination of leaking flow. Further, the resulting sized fiber product demonstrates a loss on ignition rate (LOI) that is considerably less than that obtained using conventional applicators known in the art. The round, square, incline with square and incline configurations of the lips 35, 36 and slot 19 of the slide-die apparatus 6 affect the size and shape of the bead of coating material that is contacted with the fiber surface by reducing the amount of "leaking flow" during the coating process. As a result, the configuration of the lips 35, 36 and slot 19 contributes to the observed improvement in the efficiency of the coating process using the present invention.

An important factor in achieving a uniform film flow is the formation of a sizable pressure gradient corresponding to the direction of flow, as well as maintaining a negligible pressure gradient across the central surface 10. The pressure gradient along the direction of flow is inversely proportional to the slot width A of the slot 19 and the slot height C of the slot 19 according to the following relationship:

$$\text{Pressure gradient} \propto \frac{(\text{flow rate})(\text{viscosity})}{(\text{slot width})(\text{slot height})^3}$$

Thus, the pressure gradient across the central surface 10 is directly proportional to the slot width A of the central surface 10. As an additional consideration, coating operability is limited, in part, by both the slot width A and the slot height C. Using a preferred slot height C of from about 0.01 up to about 0.02 of an inch and a central surface width A of from about 0.15 up to about 0.25 of an inch provides an acceptable operating configuration for the slide-die apparatus 6, and allows for application of a uniform thin film onto the fiber surfaces. The width of the slot 19 is generally equal to minimum aperture distance $B_1$.

The size that may be applied using the slide-die applicator 6 portion of the invention may be aqueous or nonaqueous, and preferably ranges in viscosity from as low as 1 cp up to about 500 cps. Typical sizes may include ingredients such as film formers, coupling agents, waxes, thermoplastic polymers, lubricants, wetting agents and other conventional additives.

The apparatus 9 of the present invention may be used to apply both aqueous and non-aqueous sizing at different temperatures. The following examples are representative of the disclosed invention, but do not in any way limit the scope thereof.

EXAMPLES

Applicators of the present invention were used in various trials to apply aqueous and non-aqueous size coatings to the surfaces of standard S-2 continuous glass fibers. Coating performance using the applicators of the present invention were evaluated and compared to other types of applicators known in the art. The examples below provide a detailed description of the evaluation and comparison. Unless otherwise noted, the fiber product was a 400-fiber strand, the fibers within the strand being of 13 microns in fiber diameter. Forming conditions required a throughput of about 25 lb/hr and a pull speed of about 4000 fpm.

Example 1

Trials were run to measure the coating window and effectiveness of the slide-die applicator having the round configuration, with and without a water pre-spray, and those results compared to those obtained when only a spray applicator was used. A 5.5% composition of a commercially available size formulation was applied to fibers at an application rate of 1500 g/min. The spray nozzle used was an air-atomizing nozzle—model # SUE18A from SPRAYING SYSTEMS CO., which was equipped with a 40 micron filter and variable air and water pressure. The spray head was placed 2.9 inches above the center of the slide-die. The pre-spray volume was 1.5 gallon/hr and the vacuum pressure was 59 inch $H_2O$, which produced a vacuum flow of 190 cubic feet per minute (CFM) at the inlet.

The size was supplied from a 10 gallon size tank to the slide-die applicator by a COLE-PARMER GEAR PUMP SYSTEM (Micro-pump digital control #900-1010, gear pump drive #900-1009, pump head #201-000-000 and #185-000-009). The size was pumped through a tube from the size tank to the die. The cartridge heaters were adjusted to maintain a temperature of 30° C. within the holding block.

The fibers were coated according to the process of the invention, after which properties such as the percentage loss on ignition (LOI) and the percentage moisture of the product were determined. The slide-die applicator used was the round design of FIG. 4. The same slide-die applicator was used in the slide-die with pre-applicator combination and the slide-die applicator alone. The results of the comparisons are shown in Table 1 below.

TABLE 1

Low End Coating Window

|  | LOI % | Moisture % |
|---|---|---|
| Spray Only (comparative) | 0.3 | 4 |
| Slide-die Applicator Only (invention) | 0.5 | 6 |
| Slide die with Pre-Applicator (invention) | 0.3 | 3 |

The results obtained indicate that the coating operability window was much improved with the combination. Each of the spray applicator or slide-die applicator alone produced poorer operability than the slide-die with applicator pre-applicator combination. Using either device singly resulted in higher levels of retained moisture in the coated strand product. Further, the generation of negative pressure behind the fiber fan using the vacuum greatly improved the pre-spray penetration. In this manner, the excess size recycling system of the invention effectively recycled most of the excess size. The observed overall recycling efficiency was greater than 95%.

Example 2

The slide-die applicators of the present invention shown in FIGS. 3D, and 4–6, were also compared to applicators fitted with dies having a conventional design commonly known in the art. The resulting products were compared to measure the differences in loss on ignition or strand solids, which is the percentage of the dried material (fiber with dried coating) that is organic and will burn off when burnt at a temperature above 1200° F., the forming moisture which is the percentage of the material (fiber and wet coating) that is water and will evaporate when heated, and application efficiency which is the amount of solids retained in the package to that applied by the applicator.

TABLE 2

Low End Coating Window

| Designs | LOI % | Forming Moisture % | Application Efficiency % | Leaking |
|---|---|---|---|---|
| Conventional* ⅙ in. slide width | 0.66 | 8.27 | 76 | Yes |
| Conventional* ¼ in. slide width | 0.62 | 7.83 | 71 | Yes |
| Invention - square | 0.54 | 6.50 | 87 | No |
| Invention - incline | 0.47 | 6.38 | 82 | No |
| Invention - round | 0.52 | 6.28 |  | No |
| Invention - incline with square | 0.53 | 6.46 | 95 | No |

*AKZO NOBEL-RAUSCHERT designs had slide widths of ⅙ in. and ¼ in., respectively. The designs were the same as the standard AKZO-NOBEL'S. However, the slide-die apparatus material was changed from ceramic to graphite.

Table 2 shows that the slide-dies of the present invention achieved the lowest achievable LOI, moisture, and corresponding application efficiency in forming without fiber breaks. In general, the lower the LOI and moisture and the higher the application efficiency, the better will be the coating operability window and forming efficiency. It was observed that all the four designs of the invention gave better coating and forming performance than the conventional designs since lower forming moisture and LOI were obtained. It was also apparent that the application efficiency was much improved as a result of elimination of the "leaking" flow.

Uniform film flow was best achieved by creating a large pressure gradient in the flow direction and negligible pressure gradient across the slide-die applicator. Because the pressure gradient along the flow was inversely proportional to the cube of the slot height and the pressure gradient across the slide-die applicator is proportional to the slot width, the coating operability window was limited by the slot width and slot height. Through a series of trials, it was identified that a slot width less than 0.25 inch and a slot height less than 0.02 inch are preferred operating limit for this slide-die applicator to deliver an aqueous (viscosity less than 50 cp) uniform thin film flow at an application rate less than 30 g/min.

Example 3

The slide-die applicator (without pre-application) equipped with either the round or square-shaped die was also compared to a conventional apron belt applicator at an application rate of 30 g/min. The following table show the comparison.

TABLE 3

| Designs | LOI % | Forming Moisture % |
|---|---|---|
| Slide-die Square (invention) | 0.8 | 10.86 |
| Slide-die Round (invention) | 0.78 | 10.54 |
| Apron Belt (comparison) | 0.77 | 12.09 |

The results indicate that the LOI produced by the slide-die applicator was approximately the same as that produced by the apron belt applicator. The amount of forming moisture, however, was about 1 to 1.5% lower.

Example 4

In addition to successfully applying aqueous size, the invention was also successfully used to apply a non-aqueous polyethylene glycol monooleate size, having a viscosity of about 200 cps, to fibers of diameter greater than 10 microns. Wax, which is crystalline at room temperature, and a commercially available non-aqueous size were each successfully applied to fibers of diameter greater than 15 microns. With the aid of two heating cartridges inserted inside of the holding block the applicator can be used to apply both aqueous and non-aqueous sizing at a temperature of from about 60°F. to 400° F. Excellent application efficiency (>90%) was obtained at application rates of less than 20 g/min.

Various modifications of the above-described embodiments of the invention will be apparent to those skilled in the art, and it is to be understood that such modifications can be made without departing from the scope of the invention.

We claim:

1. A slide-die applicator for applying a size to a fiber comprising:
    a central body having a central surface bounded by a first edge, a second edge, a top edge and a bottom edge, the top and bottom edges lying in a common plane, the central surface having a generally semi-circular shape projecting from the common plane the central body further comprising a rear surface and a slot having an upper lip with an upper lip surface and a lower lip with a lower lip surface, at least one of said lips having a straight cut into the semi-circular shaped central surface adjacent the slot, said upper lip defining an upper lip angle between the upper lip surface and the common plane, said lower lip defining a lower lip angle between the lower lip surface and the common plane;
    a first outwardly projecting side wall having a first inner edge attached to the first edge of the central surface, the first outwardly projecting sidewall further having a first outer edge;
    a second outwardly projecting side wall having a second inner edge attached to the first edge of the central surface, the second outwardly projecting sidewall further having a second outer edge;
    the first and second inner edges defining a minimum aperture distance therebetween;
    the first and second outer edges defining a maximum aperture distance therebetween;
    the first and second outwardly projecting walls defining an inner region therebetween; and
    wherein the slot connects the central surface of the central body to a source of a size to allow the size to move from the source of the size to the central surface of the central body.

2. The slide-die applicator as claimed in claim 1, wherein the upper lip and lower lip of the slot each have a substantially square corner adjacent the slot when viewed in cross section taken perpendicular to the common plane along a line parallel to the first and second edges.

3. The slide-die applicator as claimed in claim 1, wherein the upper lip and lower lip of the slot have a shape having an incline configuration on the central surface.

4. The slide-die applicator as claimed in claim 3, wherein the upper lip and lower lip of the slot have a shape having a square configuration on the central surface.

5. The slide-die applicator as claimed in claim 1, wherein the upper lip angle is about 0 degree and the lower lip angle is about 0 degree.

6. The slide-die applicator as claimed in claim 1, wherein the upper lip further comprises an upper lip corner having an upper lip corner angle, and the lower lip further comprising a lower lip corner having a lower lip corner angle.

7. The slide-die applicator as claimed in claim 6, wherein the upper lip corner angle is about 80 degrees and the lower lip corner angle is about 45 degrees.

8. The slide-die applicator as claimed in claim 6, wherein the upper lip corner angle is about 60 degrees and the lower lip corner angle is about 45 degrees.

9. The slide-die applicator as claimed in claim 1, wherein the slot has a slot width measured substantially parallel the top edge, the width being about equal to a distance between the first and second edges of the central surface.

10. The slide-die applicator as claimed in claim 1, wherein the central body further comprises a bore extending from the slot to the rear surface of the central body.

11. An apparatus as claimed in claim 1, wherein the central body is formed of graphite.

12. An apparatus for applying size to a fiber comprising:
    a slide-die comprising:
        a slide-die applicator for applying a size to a fiber comprising:
            a central body having a central surface bounded by a first edge, a second edge, a top edge and a bottom edge, the top and bottom edges lying in a common plane, the central surface having a generally semi-circular shape projecting from the common plane, the central body further comprising a rear surface and a slot having an upper lip with an upper lip surface and a lower lip with a lower lip surface, said upper and lower lip surfaces each having a straight cut into the semi-circular shaped central surface adjacent the slot, said upper lip defining an upper lip angle between the upper lip surface and the common plane, said lower lip defining a lower lip angle between the lower lip surface and the common plane;
            a first outwardly projecting side wall having a first inner edge attached to the first edge of the central surface, the first outwardly projecting sidewall further having a first outer edge;
            a second outwardly projecting side wall having a second inner edge attached to the first edge of the central surface, the second outwardly projecting sidewall further having a second outer edge;
            the first and second inner edges defining a minimum aperture distance therebetween;
            the first and second outer edges defining a maximum aperture distance therebetween;
            the first and second outwardly projecting walls defining an inner region therebetween; wherein the slot connects the central surface of the central body to a source of a size to allow the size to move from the source of the size to the central surface of the central body;
            and a fluid flow control means in fluid contact with the slide-die.

13. The apparatus as claimed in claim 12, further comprising a holding block supporting the central body.

14. The apparatus as claimed in claim 13, wherein the holding block comprises an opening for fitting a supply conduit to the slide-die for supplying the source of the size.

15. An apparatus as set forth in claim 13, wherein the holding block comprises at least one heating means to heat the size.

16. An apparatus as claimed in claim 15, wherein the heating means comprises a cartridge heater inserted within the holding block.

17. An apparatus as claimed in claim 13, wherein the central body is formed of graphite.

18. An apparatus as claimed in claim 13, wherein the holding block comprises a base comprising a recycle pan and a drain.

19. The apparatus as claimed in claim 12, wherein the fluid control means comprises a positive displacement metering pump.

20. An apparatus as claimed in claim 12, further comprising a pre-applicator positioned above the slide-die applicator for applying a pre-spray of first size.

21. An apparatus as claimed in claim 20, wherein the slide-die applicator further comprises a holding block supporting the central body and the pre-applicator.

22. An apparatus as claimed in claim 21, wherein the holding block comprises at least one cartridge heater inserted into the holding block to heat a coating.

23. An apparatus as claimed in claim 21, wherein the holding block comprises a recycle pan for collecting excess size and a drain in fluid communication with a supply conduit for recycling excess size to the slide die applicator.

24. An apparatus as claimed in claim 21, wherein the pre-applicator for applying the first coating is a spray applicator.

25. An apparatus as claimed in claim 24, wherein the spray applicator comprises an atomizing spray nozzle.

26. An apparatus as claimed in claim 20, further comprising a vacuum source for collecting excess size from the pre-applicator wherein the vacuum source is supported by the holding block and positioned opposite the pre-applicator such that the fiber passes between the vacuum source and the pre-applicator, the pre-applicator for applying first coating on the fiber.

27. An apparatus as set forth in claim 26, wherein the slide-die applicator further comprises a holding block supporting the central body, the holding block farther supporting the pre-applicator and the vacuum source above the central body.

28. An apparatus for applying size to a fiber comprising:
a holding block comprising a base comprising a recycle pan and a drain;
a slide-die applicator mounted on the holding block, the slide-die applicator comprising:
a central body having a central surface bounded by side walls, the central body further having a slot connected to the central surface, the slot being connected to a source of size to allow the size to move from the source to the central surface, the recycle pan being adapted to collect excess size from the central surface, wherein the recycle pan and drain connect the source of size to the central surface to recycle the excess size from the central surface through the slot;
a pre-applicator positioned above the slide-die applicator for applying a pre-spray of first size; and
a vacuum source positioned opposite the pre-applicator such that fibers pass between the vacuum source and the pre-applicator, the vacuum source producing a negative pressure to assist the pre-applicator in coating the fibers by pulling the size from the pre-applicator in a horizontal direction across the fibers while collecting excess size from the pre-applicator.

29. An apparatus of claim 28, wherein the holding block has an opening for fitting a supply conduit from a source of size, the slot being connected to the opening in the holding block to allow the size to move from the source to the central surface.

30. An apparatus of claim 28, wherein the central body is formed of graphite.

31. An apparatus of claim 28, further comprising a cartridge heater inserted within a front portion of the holding block and adjacent the central body to heat the size.

32. An apparatus of claim 28, wherein the central surface has a generally semi-circular shape.

* * * * *